United States Patent
Brown et al.

(10) Patent No.: US 7,836,214 B2
(45) Date of Patent: *Nov. 16, 2010

(54) MANAGING CONFIGURATION OF COMPUTER SYSTEMS ON A COMPUTER NETWORK

(75) Inventors: Kenneth Edgar Brown, Rochester, MN (US); Gregory Richard Hintermeister, Rochester, MN (US); Michael Bill Murphy, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 193 days.

This patent is subject to a terminal disclaimer.

(21) Appl. No.: 12/121,870

(22) Filed: May 16, 2008

(65) Prior Publication Data

US 2008/0215869 A1    Sep. 4, 2008

Related U.S. Application Data

(63) Continuation of application No. 11/375,445, filed on Mar. 14, 2006, now Pat. No. 7,398,332.

(51) Int. Cl.
 *G06F 3/00* (2006.01)
 *G06F 15/177* (2006.01)
(52) U.S. Cl. .......................... 710/8; 709/220; 709/221; 709/222
(58) Field of Classification Search ............... 710/8; 709/220–224
See application file for complete search history.

(56) References Cited

U.S. PATENT DOCUMENTS

| | | | |
|---|---|---|---|
| 5,838,918 A | 11/1998 | Prager et al. |
| 6,066,182 A | 5/2000 | Wilde et al. |
| 6,073,214 A | 6/2000 | Fawcett |
| 6,167,567 A | 12/2000 | Chiles et al. |
| 6,282,709 B1 | 8/2001 | Reha et al. |
| 2002/0100036 A1 | 7/2002 | Moshir et al. |
| 2003/0061323 A1 | 3/2003 | East et al. |
| 2004/0237086 A1 | 11/2004 | Sekiguchi et al. |
| 2005/0018697 A1 | 1/2005 | Enns et al. |

*Primary Examiner*—Niketa I Patel
(74) *Attorney, Agent, or Firm*—Martin & Associates, LLC; Bret J. Petersen; James R. Nock

(57) ABSTRACT

A system configuration manager provides a graphical user interface that allows a system administrator to easily administer configuration settings for different computer systems and platforms on a computer network. The system configuration manager allows identifying one system configuration or a settings profile as a "model system". Once the model system is defined, other computer systems may be compared to the model system. Differences between the selected computer systems and the model system are then displayed, and the system configuration manager may be used to update the selected computer systems with configuration settings specified in the model system. Cross-platform support is provided by a configuration mapping mechanism that maps configuration information from one platform to corresponding configuration information for another platform. The configuration mapping mechanism effectively hides the differences between platforms by translating the configuration information from a selected platform to corresponding configuration information for the model system.

3 Claims, 11 Drawing Sheets

Auditing

| | |
|---|---|
| QALWUSRDM | Allow user domain objects in libraries |
| QAUDCTL | Auditing control |
| QAUDENDACN | Auditing end action |
| QAUDFRCLVL | Force auditing data |
| QAUDLVL | Security auditing level |
| QCRTOBJAUD | Create object editing |

FIG. 7

Date and Time

| | |
|---|---|
| QDATE | System date |
| QDAY | Day |
| QDAYOFWEEK | Day of week (read only) |
| QHOUR | Hour of the day |
| QLEPADJ | Leap year adjustment |
| QMINUTE | Minute of the hour (read only) |
| QMONTH | Month of the year |
| QSECOND | Second of the minute (read only) |
| QTIME | Time of day (read only) |
| QUTCOFFSET | Coordinated universal time offset |
| QYEAR | Year |

FIG. 8

Devices

| | |
|---|---|
| QAUTOCFG | Autoconfigure devices |
| QAUTORMT | Autoconfigure of remote controllers |
| QAUTOVRT | Autoconfigure virtual devices |
| QDEVNAMING | Device naming conventions |
| QDEVRCYACN | Device I/O error action |

FIG. 9

Library Lists

| | |
|---|---|
| QSYSLIBL | System part of the library list |
| QUSRLIBL | User part of the library list |

FIG. 10

International

| | |
|---|---|
| QCCSID | Coded character set identifier |
| QCHRID | Graphic character set and code page |
| QCHRIDCTL | Character identifier control |
| QCNTRYID | Country identifier |
| QCURSYM | Currency symbol |
| QDATFMT | Date format |
| QDATSEP | Date separator |
| QDECFMT | Decimal format |
| QIGC | DBCS version installed indicator (read only) |
| QIGCCDEFNT | Double byte code font |
| QIGCFNTSIZ | Coded font size |
| QKBDTYPE | Keyboard language character set |
| QLANGID | Language identifier |
| QLOCALE | Locale path name |
| QSETJOBATR | Set job attributes from locale |
| QSRTSEQ | Sort sequence |
| QTIMSEP | Time separator |

FIG. 11

Jobs

| | |
|---|---|
| QACTJOB | Initial number of active jobs |
| QADLACTJ | Additional number of active jobs |
| QADLTOTJ | Additional number of total jobs |
| QDSCJOBITV | Time interval before disconnected jobs end |
| QINACTITV | Inactive job time-out |
| QINACTMSGQ | Inactive job message queue |
| QJOBMSGQFL | Job message queue full action |
| QJOBMSGQMX | Maximum size of job message queue |
| QJOBSPLA | Spooling control block initial size |
| QMAXJOB | Maximum number of jobs |
| QMAXSPLF | Maximum number of spoolfiles per job |
| QMLTTHDACN | Multithreaded job action |
| QTOTJOB | Initial total number of jobs |

FIG. 12

Messages and Logging

| | |
|---|---|
| QAUTOSPRPT | Automatic system disabled reporting |
| QACGLVL | Accounting level |
| QCFGMSGQ | Configuration message queue |
| QHSTLOGSIZ | Maximum history log queue |
| QPRBFTR | Problem log filter |
| QPRBHLDITV | Problem log hold interval |
| QRMTSRVATR | Remote service attribute |
| QSFWERRLOG | Softwware error logging |
| QSRVDMP | Service dump control |
| QSTSMSG | Display status messages |

FIG. 13

Password

| | |
|---|---|
| QPWDEXPITV | Password expiration interval |
| QPWDLMTAJC | Limit adjacent digits in password |
| QPWDLMTCHR | Limit characters in password |
| QPWDLMTREP | Limit repeating characters in password |
| QPWDMAXLEN | Maximum password length |
| QPWDMINLEN | Minimum password length |
| QPWDPOSDIF | Limit password character positions |
| QPWDRQDDGT | Require digit in password |
| QPWDRQDDIF | Duplicate password control |

FIG. 14

Performance

| | |
|---|---|
| QBASACTLVL | Base storage pool activity level |
| QBASPOOL | Base storage pool minimum size |
| QCMNARB | Communication arbiters |
| QCMNRCYLMT | Communication recovery limits |
| QDYNPTYADJ | Dynamic priority adjustment |
| QDYNPTYSCD | Dynamic priority scheduler |
| QMAXACTLVL | Maximum activity level of system |
| QMCHPOOL | Machine storage pool size |
| QPASTHRSVR | Pass-through servers |
| QPFRADJ | Performance adjustment |
| QQRYDEGREE | Parallel processing degree |
| QQRYTIMLMT | Query processing time limit |
| QTSEPOOL | Time slice end pool |

FIG. 15

Power

| | |
|---|---|
| QUPSDLYTIM | Uninterruptible power supply delay time |
| QUPSMSGQ | Uninterruptible power supply message queue |

FIG. 16

Printing

| | |
|---|---|
| QPRTDEV | Printer device description |
| QPRTKEYFMT | Print header and/or border information |
| QPRTTXT | Print text |

FIG. 17

Restart

| | |
|---|---|
| QABNORMSW | Previous end of system indicator (read only) |
| QCTLSBSD | Controlling subsystem |
| QDBRCVYWT | Database recovery wait indicator |
| QIPLDATTIM | Date and time to automatically IPL |
| QIPLSTS | IPL status indicator (read only) |
| QIPLTYPE | Type of IPL to perform |
| QPWRDWNLMT | Maximum time for PWRDWNSYS*IMMED |
| QPWRRSTIPL | Automatic IPL after power restored |
| QRMTIPL | Remote power on and IPL |
| QSCPFCONS | IPL action wtih console problem |
| QSTRPRTWTR | Start print writers at IPL (read only) |
| QSTRUPPGM | Startup program |

FIG. 18

Security

| | |
|---|---|
| QALWOBJRST | Allow object restore option |
| QCRTAUT | Create default public authority |
| QRETSVRSEC | Retain server security data |
| QSECURITY | System security level |
| QSVRAUTITV | Server authentication interval |
| QUSEADPAUT | Use adopted authority |
| QVFYOBJRST | Verify signatures during restore |

FIG. 19

Sign-on

| | |
|---|---|
| QDSPSGNINF | Sign-on display information control |
| QLMTDEVSSN | Limit device sessions |
| QMAXSGNACN | Action to take for failed signon attempts |
| QMAXSIGN | Maximum sing-on attempts allowed |
| QRMTSIGN | Remote sign-on control |

FIG. 20

Storage

| | |
|---|---|
| QRCLSPLSTG | Reclaim pool storage |
| QSTGLOWACN | Auxiliary storage lower limit action |
| QSTGLOWLMT | Auxiliary storage lower limit |

FIG. 21

System Control

| | |
|---|---|
| QASTLVL | User assistance level |
| QATNPGM | Attention program |
| QCONSOLE | Console name (read only) |
| QFRCCYNRST | Force conversion on restore |
| QKBDBUF | Type ahead and/or attention key option |
| QMODEL | SYstem model number (read only) |
| QPRCFEAT | Processor feature code (read only) |
| QSPCENV | Special environment |
| QSRLNBR | System serial number (read only) |

FIG. 22

Management Central per Endpoint System

| | |
|---|---|
| YPS_MAXPTF_SIZE | Maximum data transfer size |
| YPS_MAX_SOCKETS | Maximum number of connections |
| YPS_SOCKETTIMEOUT | Endpoint connection timeout |
| YPS_MAX_CONTIMOUT | |
| YPS_DISCOVERY_TIMEOUT | Discovery timeout |
| YPS_TRACE | |
| YPS_SSL | Use SSL |
| YPS_DNS | IP address lookup frequency |
| YPS_USER_PASSWORD | Require password on endpoint systems |

FIG. 23

Management Central per Central System

YPS_DISC_LCLSUBNET       List of subnets to discover
YPS_DISCOVERY_STARTUP   Discover systems when MC server starts up
YPS_FTP_DISCOVERY        Use FTP to discover systems
YPS_SNMP_DISCOVERY      Use SNMP to discover systems
YPS_EARLIEST_RELEASE     Earliest OS/400 release to search for
YPS_IP_DISCOVERY
YPS_AUTH_LEVEL           SSL authentication level

MANAGING CONFIGURATION OF COMPUTER SYSTEMS ON A COMPUTER NETWORK

CROSS-REFERENCE TO PARENT APPLICATIONS

This patent application is a continuation of U.S. Ser. No. 11/375,445 filed on Mar. 14, 2006, which is a continuation of U.S. Ser. No. 09/879,510 filed on Jun. 12, 2001, which issued as U.S. Pat. No. 7,171,458 on Jan. 30, 2007. Both of these parent applications are incorporated herein by reference.

BACKGROUND OF THE INVENTION

1. Field of the Invention

This invention generally relates to the data processing field. More specifically, this invention relates to configuring computer systems in a networked computing environment.

2. Background Art

Since the dawn of the computer age, computer systems have become indispensable in many fields of human endeavor including engineering design, machine and process control, and information storage and access. In the early days of computers, companies such as banks, industry, and the government would purchase a single computer which satisfied their needs, but by the early 1950's many companies had multiple computers and the need to move data from one computer to another became apparent. At this time computer networks began being developed to allow computers to work together.

Networked computers are capable of performing tasks that no single computer could perform. In addition, networks allow low cost personal computer systems to connect to larger systems to perform tasks that such low cost systems could not perform alone. Most companies in the United States today have one or more computer networks. The topology and size of the networks may vary according to the computer systems being networked and the design of the system administrator. It is very common, in fact, for companies to have multiple computer networks. Many large companies have a sophisticated blend of local area networks (LANs) and wide area networks (WANs) that effectively connect most computers in the company to each other. Most existing computer networks have a client-server architecture, where one or more server machines service requests from client machines (such as desktop computer systems).

Computer networks are typically managed by one or more "system administrators." A system administrator is responsible for making sure the network runs smoothly. This means that a system administrator typically is responsible for many tasks, including: making hardware upgrades, installing new software on servers, installing software on client machines, setting security parameters for network resources, etc.

One complication for system administrators is that many modern networks include computer systems that run different operating systems, commonly referred to in the art as "platforms". Each platform has its own unique operating system. As a result, the tools for configuring a client computer system are platform-specific. For example, if a system administrator works on a network that includes IBM zSeries computers, IBM iSeries computers, and IBM pSeries computers, the system administrator will have to learn the platform-specific management tools to set system settings for each of these three platform types. Another complication is that the system settings for each platform may vary in number, type, and name. This requires a system administrator to keep track of which system setting on one platform corresponds to a similar system setting on a different platform. With the complication of many platforms on a network, resulting in different systems settings and different tools for changing those system settings, a system administrator has a difficult job, indeed. Without a mechanism and method for administrating computer system settings for different platforms in a common, uniform way, the computer industry will continue to suffer from inefficient ways of administrating the system settings of computer systems on computer networks.

BRIEF SUMMARY OF THE INVENTION

According to the preferred embodiments, a system configuration manager provides a graphical user interface that allows a system administrator to easily administrate configuration settings for different platforms on a computer network. Configuration settings includes system settings as well as customization settings that determine a variety of operational parameters for the computer system, such as desktop appearance, application preferences and options, browser bookmarks, workload balancing, security settings, etc. The system configuration manager of the present invention allows identifying one system configuration as a "model system". The model system may be an existing computer system on the network, or could be an imaginary system configuration. Once the model system is defined, other computer systems may be compared to the model system. Differences between the selected computer systems and the model system are then displayed, and the system configuration manager may be used to update the selected computer systems with configuration settings specified in the model system. Cross-platform support is provided by a configuration mapping mechanism that maps configuration settings from one platform to corresponding configuration settings for another platform. The configuration mapping mechanism effectively hides the differences between platforms by translating the configuration information from a selected platform to corresponding configuration information for the model system. The system configuration manager of the preferred embodiments also includes a platform-independent interface that includes a superset of all configuration information for all platforms on the network. The configuration mapping mechanism then maps the platform-specific configuration information to the platform-independent interface, allowing configuration information for all platforms to be displayed and managed using the system configuration manager.

The foregoing and other features and advantages of the invention will be apparent from the following more particular description of preferred embodiments of the invention, as illustrated in the accompanying drawings.

BRIEF DESCRIPTION OF THE SEVERAL VIEWS OF THE DRAWING

The preferred exemplary embodiments of the present invention will hereinafter be described in conjunction with the appended drawings, where like designations denote like elements, and:

FIGS. 7-24 each show different configuration settings for an IBM iSeries computer system; and FIG. 25 is a block diagram illustrating the function of the configuration mapping mechanism of FIGS. 2 and 4.

DETAILED DESCRIPTION OF THE INVENTION

The present invention relates to administration of computer systems on a computer network. For those individuals who are not generally familiar with network administration, the Overview section below presents many of the concepts that will help to understand the invention.

1. Overview

Network Administration

Figure 1:
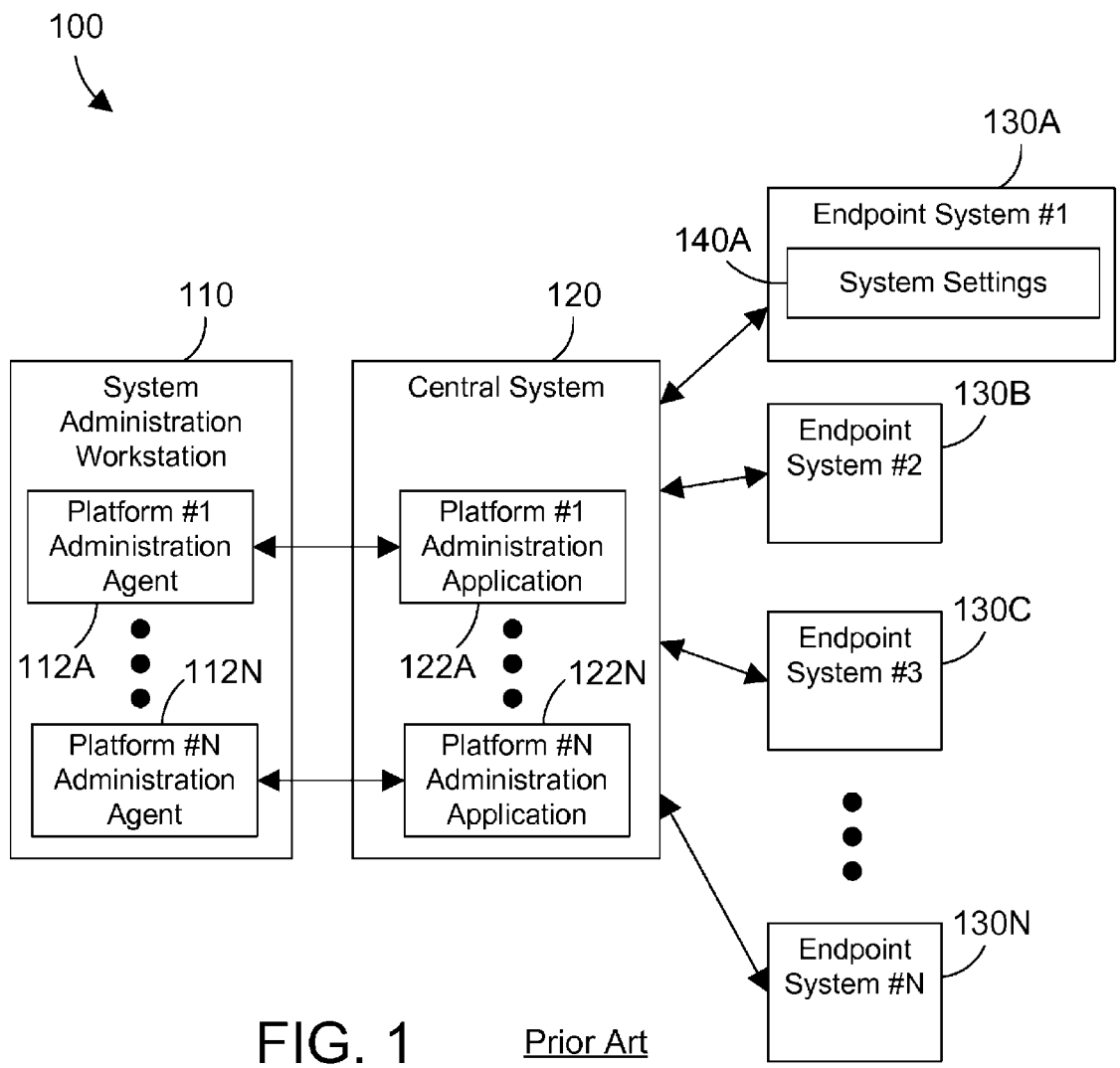
FIG. 1 is a block diagram of a prior art networked computer system showing mechanisms for administering system settings on different platform types in the computer network.

One example of a prior art configuration 100 for network administration is shown in FIG. 1. In this example, networked computer system 100 includes a central system 120, which is a network server. Coupled to the central system 120 are various client computer systems. For the discussion herein, the term "endpoint system" is used to describe any computer system on a network, and specifically includes computer systems managed by a central system. FIG. 1 shows various different endpoint systems 130 coupled to central system 120, namely 130A, 130B, 130C, . . . , 130N. In addition, there is a workstation 110 that is used by the system administrator to manage the configuration of the endpoint systems 130. Note that workstation 110 may also be an endpoint system.

We assume that the endpoint systems 130 include computer systems from different platform types, and that each endpoint system 130 includes corresponding system settings 140. Thus, Endpoint System #1 (130A) has corresponding system settings 140A, and each other endpoint system 130 has its corresponding system settings 140. In order to administrate computer systems from different platform types, system administration workstation 110 includes a platform administration agent 112 for each type of platform on the computer network. If three different platforms are present on the computer network, there will be three different platform administration agents 112, one for each platform. There are also platform administration applications 122 that communicate with their corresponding platform administration agents 112, and that communicate with endpoint systems of a particular platform type on the computer network.

The configuration 100 of FIG. 1 can be used to illustrate the inefficiency of the prior art scheme for network administration. Let's assume, for example, that Endpoint System #1 (130A) is an IBM iSeries computer system running the OS/400 operating system. Let's further assume that the platform #1 administration agent 112A and the platform #1 administration application 122A are used by a system administrator to set the system settings of endpoint system 130A. Now let's assume that endpoint system #3 130C is a personal computer running the Windows2000 operating system. There will be a different platform administration agent 112 and corresponding platform administration application 122 to set the system settings for a Windows2000 platform. In like manner, each platform type on the network will have a corresponding platform administration agent 112 and platform administration application 122. For a system administrator to be effective, he or she must learn the network administration tools (i.e., agent 112) for each platform on the network. There are currently no uniform conventions for naming of system settings, so a system administrator must also keep track of which system settings on one platform correspond to system settings on a different platform.

One of the biggest problems in the prior art as illustrated in FIG. 1 is that administration of each endpoint system is a highly manual affair. First of all, the desired settings for each type of platform must be written down and stored in some form. If a system administrator suspects that a system setting on endpoint system #2 (130B) is incorrect, the system administrator must use the correct platform administration agent 112 that matches the platform type of endpoint system #2 to request that the corresponding platform administration application 122 interrogate endpoint system #2 to determine the value for the suspect setting. The system administrator examines the retrieved value for the system setting, compares it to the desired value, and if they differ, uses the appropriate platform administration agent 112 to manually set the system setting to the desired value. Performing these steps on many systems becomes a very labor-intensive process. Furthermore, performing these steps on different platforms requires a great deal of proficiency using the different platform administration agents 112. The prior art provides no known way to specify a desired system configuration, and to automatically update all systems to match the desired system configuration. This is the beauty and function of the present invention, discussed in detail below.

2. Detailed Description

An apparatus and method in accordance with the preferred embodiments provides a consistent interface for administrating different platform types, and provides a way to automatically update configuration settings to match the settings of a model system. The system administrator may specify a model system, either by specifying a settings profile as the model system or by selecting an existing system on the network as the model system. The system administrator then selects one or more endpoint systems on the network for comparison against the model system. Differences between the model system and the selected endpoint systems are displayed on a graphical user interface. The system administrator may then select certain endpoint systems for updating, and the system configuration manager then updates the selected endpoint systems to match the settings of the model system. The system configuration manager includes a configuration mapping mechanism to perform mapping of configuration information across platforms and to the model system.

Figure 2:
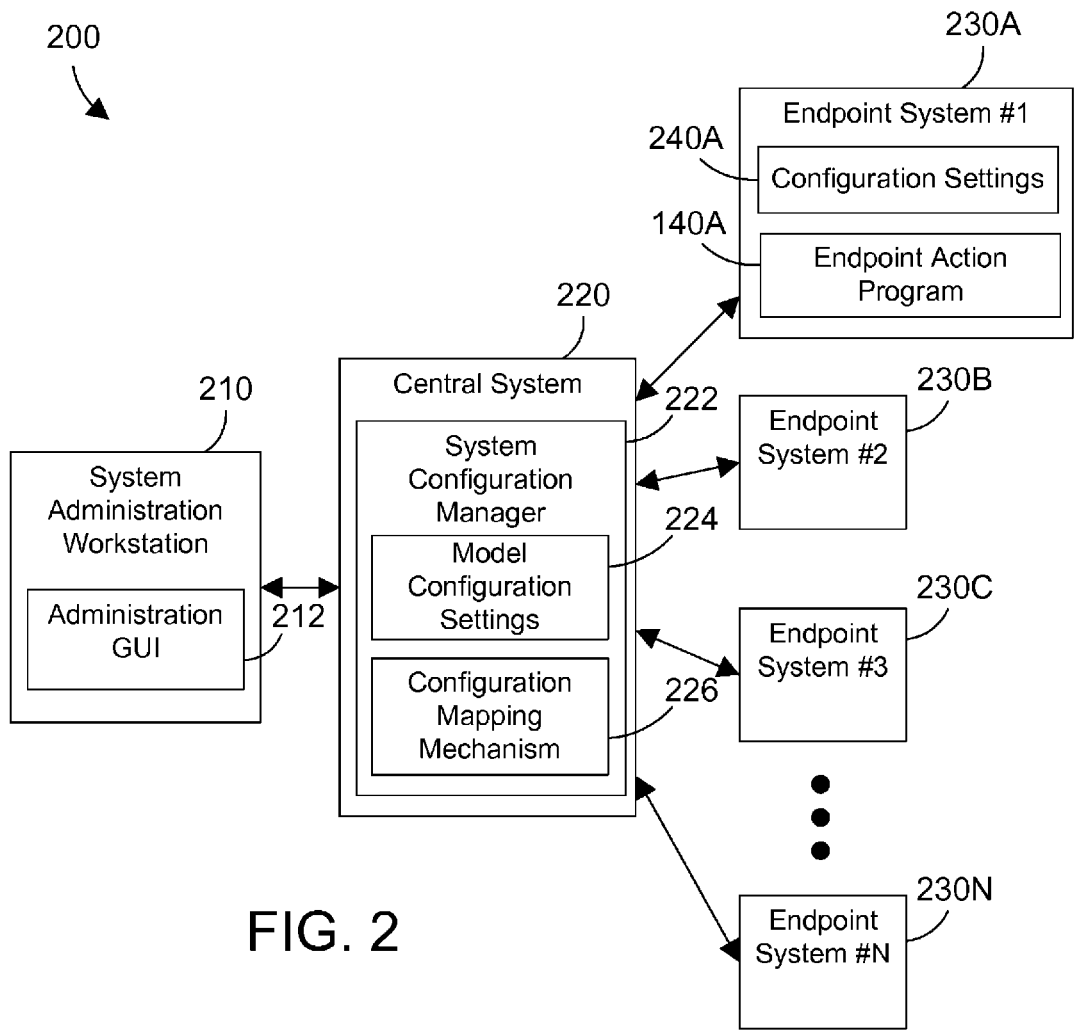
FIG. 2 is a block diagram of a networked computer system in accordance with the preferred embodiments.

Referring to FIG. 2, a networked computing system 200 in accordance with the preferred embodiments includes a system administration workstation 210 coupled to a central system 220, which is in turn coupled to endpoint systems 230 (such as 230A, 230B, 230C and 230N shown in FIG. 2). System administration workstation 210 includes an administration graphical user interface (GUI) 212. Central system 220 includes a system configuration manager 222 that includes model configuration settings 224 and a configuration mapping mechanism 226. Model configuration settings are settings that may be used as a model for other computer systems on the network. In one example, model configuration settings are set by a user entering information into an editor to specify a particular "settings profile" that defines the configuration settings for the model system. In another example, a user may select one particular computer system on the network, and its configuration settings are then read and become the configuration settings for the model system. The preferred embodiments expressly extends to any mechanism or method for defining configuration settings for a model system.

Configuration mapping mechanism 226 is used to map configuration settings from one format to a different format. For example, the model system may be a settings profile that is generic in the sense that it is not specific to any particular computing platform. In this case, the configuration mapping mechanism 226 would perform required mapping functions from platform-specific configuration settings to the generic configuration settings for the model system. In addition, the configuration mapping mechanism 226 would also perform mapping in the reverse direction, namely mapping between the generic configuration settings and corresponding configuration settings for each platform type that requires updating. Furthermore, the configuration mapping mechanism 226 could perform mapping directly from configuration settings on a first platform to corresponding configuration settings on a second platform. This function is especially useful when an existing computer system on the network is selected as the model system. In sum, the configuration mapping mechanism 226 could perform any required mapping of configuration settings from one type to another.

Each endpoint computer system includes configuration settings 240. In addition, each endpoint computer system 240 preferably includes an endpoint action program 140 that receives the request to update configuration settings 240 from the system configuration manager 222 and that reports the status of the requested update to system configuration manager 222. Thus, endpoint system #1 230A in FIG. 2 has corresponding configuration settings 240A and a corresponding endpoint action program 140A. Each of the other endpoint systems 230 may also have corresponding configuration settings 240 and endpoint action program 140.

Figure 3:
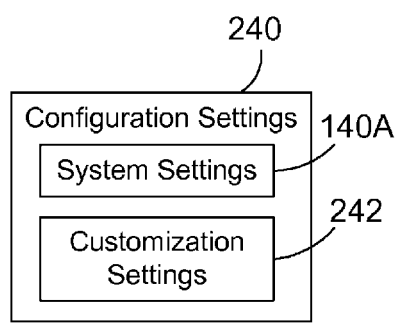
FIG. 3 is a block diagram showing one suitable implementation of the configuration settings shown in FIG. 2.

The term "configuration settings" is a broad term that is used herein to mean any setting on a computer system that "configures" the computer system. Referring to FIG. 3, examples of some configuration settings are system settings 140A and customization settings 242. System settings 140A are setup parameters in an operating system that determine how the endpoint system will operate. Note that system settings 140A in FIG. 3 are the same as system settings 140A in FIG. 1. In other words, the configuration settings 240 of the preferred embodiments include the system settings 140A that are setup using the dedicated tools for each platform, as is known in the art and discussed above with reference to FIG. 1. In addition, the configuration settings 240 include customization settings 242. The term "customization settings" is a broad term that means anything on the computer system 240 that may be configured and that is not a system setting 140A. Customization settings 242 may determine how a software application runs; how a desktop on a graphical user interface looks; which bookmarks are available in a web browser, etc. Customization settings 242 may include virtually any parameter that is not a system setting that may be configured to affect that operation of computer system 240.

One key advantage of the preferred embodiments disclosed herein is the ability to not only set system settings 140A, but to also set customization settings 242. Let's assume that a company has a graphical screen saver with the company logo, and mandates that each employee use the company's screen saver for the sake of consistency and for the purpose of having a uniform look when clients are present. System configuration manager 222 could be used to periodically (i.e., once a week or every night) set the screen saver for each endpoint computer system to the company logo screen saver. In another example, let's assume that the company has a list of frequently-accessed web sites that are useful for most employees. The company could define a bookmark folder that includes this list of web sites. Using the system configuration manager 222 of the preferred embodiments, the company could update the bookmark folder to include new web sites or to delete old web sites, and could then update each endpoint system with the new bookmark folder. In yet another example, for a server computer system, performance tuning can be performed, such as setting the maximum number of jobs running on the server computer system. In this manner each endpoint system is updated with the new bookmarks in an efficient manner. The ability to easily change both system settings and configuration settings makes system configuration manager 222 a very powerful tool that allows efficient administration of computer systems on a network.

Another advantage of the preferred embodiments is that system configuration manager 222 provides a consistent interface (namely, GUI 212) for administration of different computer platforms. The configuration mapping mechanism 226 is used to translate a configuration setting for one platform into a corresponding configuration setting for a different platform, or into a corresponding configuration setting for a generic model system that is platform-independent. One way to provide support for all platforms is to provide a GUI 212 that displays a superset of all configuration settings for all platforms. This allows the same GUI 212 to be used in administrating configuration settings for different platforms on the network.

Figure 4:
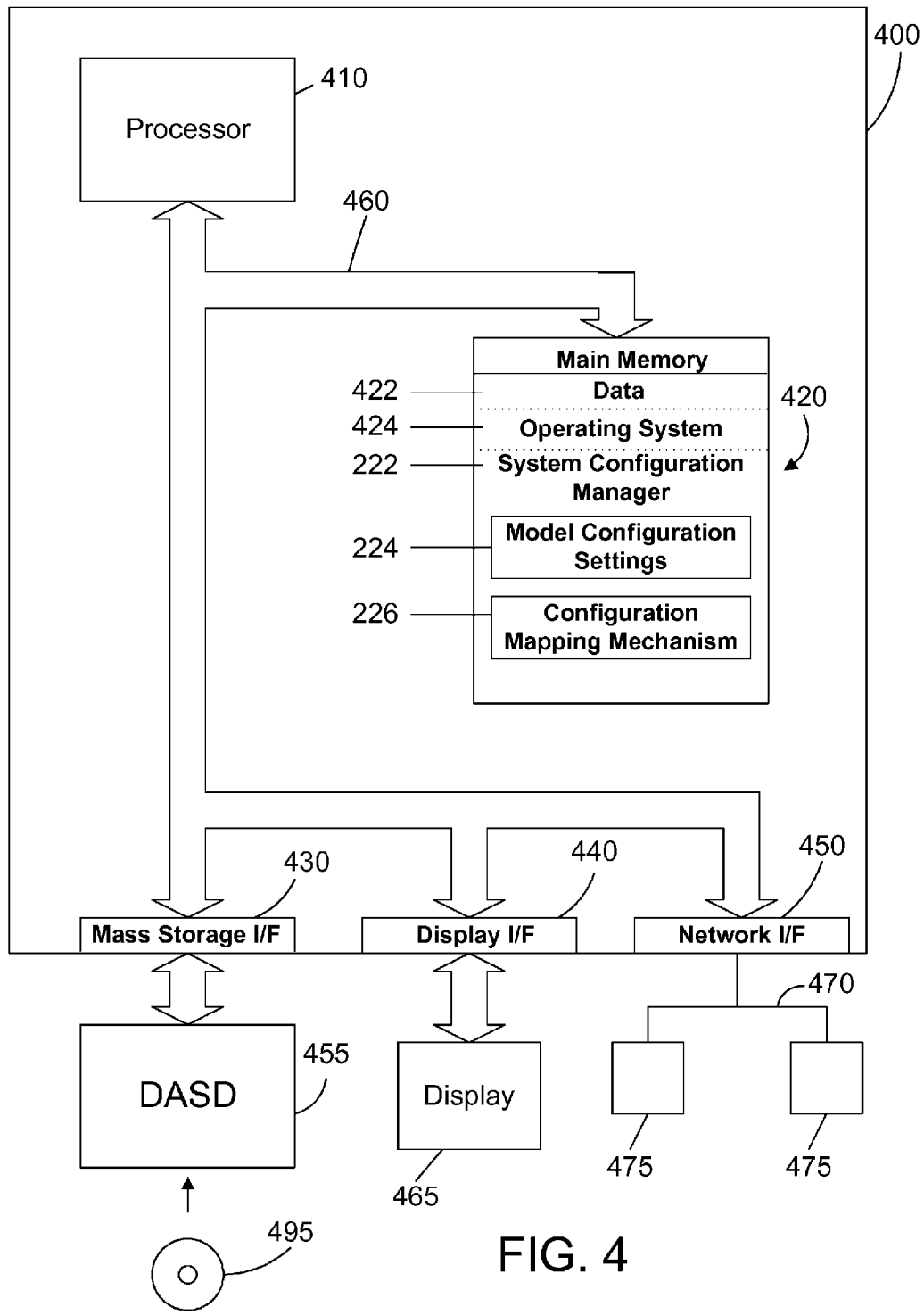
FIG. 4 is a block diagram of one specific implementation of central system 220 of FIG. 2 in accordance with the preferred embodiments.

Referring to FIG. 4, a computer system 400 in accordance with the preferred embodiment is an IBM iSeries computer system. However, those skilled in the art will appreciate that the mechanisms and apparatus of the present invention apply equally to any computer system, regardless of whether the computer system is a complicated multi-user computing apparatus, a single user workstation, or an embedded control system. Computer system 400 is one suitable implementation for central system 220 in FIG. 2. As shown in FIG. 4, computer system 400 comprises a processor 410, a main memory 420, a mass storage interface 430, a display interface 440, and a network interface 450. These system components are interconnected through the use of a system bus 460. Mass storage interface 430 is used to connect mass storage devices (such as a direct access storage device 455) to computer system 400. One specific type of direct access storage device 455 is a readable and writable CDROM drive, which may store data to and read data from a CDROM 495.

Main memory 420 in accordance with the preferred embodiments contains data 422, an operating system 424, and system configuration manager 222. In the preferred embodiments, system configuration manager 222 includes model configuration settings 224 and configuration mapping mechanism 226. Note that system configuration manager 222 in FIG. 4 is shown to contain the model configuration settings 224 and configuration mapping mechanism 226, but these items 224 and 226 could also be provided separate from system configuration manager 222 within the scope of the preferred embodiments. Note that the model configuration settings 224 and configuration mapping mechanism 226 are discussed above with reference to FIGS. 2 and 3.

Computer system 400 utilizes well known virtual addressing mechanisms that allow the programs of computer system 400 to behave as if they only have access to a large, single storage entity instead of access to multiple, smaller storage entities such as main memory 420 and DASD device 455. Therefore, while data 422, operating system 424, and system configuration manager 222 are shown to reside in main memory 420, those skilled in the art will recognize that these items are not necessarily all completely contained in main memory 420 at the same time. It should also be noted that the term "memory" is used herein to generically refer to the entire virtual memory of computer system 400.

Data 422 represents any data that serves as input to or output from any program in computer system 400. Operating system 424 is a multitasking operating system known in the industry as OS/400; however, those skilled in the art will appreciate that the spirit and scope of the present invention is not limited to any one operating system.

Processor 410 may be constructed from one or more microprocessors and/or integrated circuits. Processor 410 executes program instructions stored in main memory 420. Main memory 420 stores programs and data that processor 410 may access. When computer system 400 starts up, processor 410 initially executes the program instructions that make up operating system 424. Operating system 424 is a sophisticated program that manages the resources of computer system 400. Some of these resources are processor 410, main memory 420, mass storage interface 430, display interface 440, network interface 450, and system bus 460.

Although computer system 400 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 410. However, those skilled in the art will appreciate that the present invention applies equally to computer systems that simply use I/O adapters to perform similar functions.

Display interface 440 is used to directly connect one or more displays 465 to computer system 400. These displays 465, which may be non-intelligent (i.e., dumb) terminals or fully programmable workstations, are used to allow system administrators and users to communicate with computer system 400. Note, however, that while display interface 440 is provided to support communication with one or more displays 465, computer system 400 does not necessarily require a display 465, because all needed interaction with users and other processes may occur via network interface 450.

Network interface 450 is used to connect other computer systems and/or workstations (e.g., 475 in FIG. 4) to computer system 400 across a network 470. The present invention applies equally no matter how computer system 400 may be connected to other computer systems and/or workstations, regardless of whether the network connection 470 is made using present-day analog and/or digital techniques or via some networking mechanism of the future. In addition, many different network protocols can be used to implement a network. These protocols are specialized computer programs that allow computers to communicate across network 470. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROM (e.g., 495 of FIG. 4), and transmission type media such as digital and analog communications links.

Figure 5:
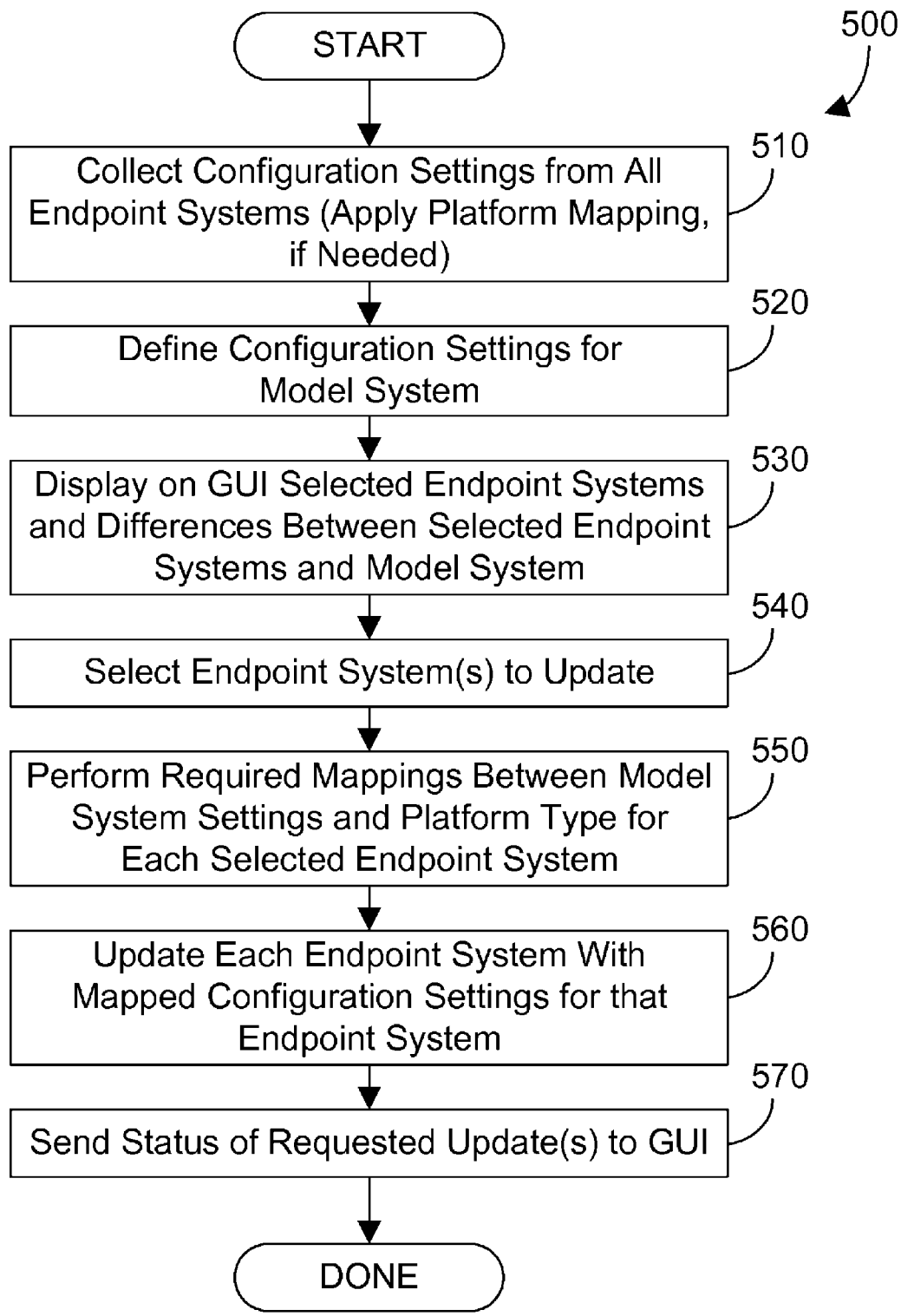
FIG. 5 is a flow diagram of a method for managing configuration settings in accordance with the preferred embodiments.

Referring now to FIG. 5, a method 500 in accordance with the preferred embodiments begins by collecting configuration settings 510 from all endpoint systems (step 510). Note that step 510 may include the mapping of configuration settings. The configuration settings for a model system are defined (step 520). There are many suitable ways to define configuration settings for a model system. For example, a user may simply use an editor tool to define a "settings profile" that includes appropriate settings for any desired system settings or customization settings. In another example, a user can select an existing endpoint system as the model system, and its configuration settings will be used as the model configuration settings. The preferred embodiments expressly extend to any way to define model configuration settings in step 520.

The various endpoint systems are then displayed on the GUI, allowing a user to select certain (or all) of these endpoint systems for comparison against the configuration settings for the model system, and displays any differences between the configuration settings in the selected endpoint systems and the configuration settings for the model system (step 530). Next, certain (or all) endpoint systems are selected for updating (step 540), preferably by a user clicking on the endpoint systems to update in the GUI. Next, each endpoint system is analyzed to determine its platform type, and the configuration settings for the model system are then mapped to corresponding configuration settings for each platform type (step 550). Each endpoint system is then updated with the mapped configuration settings for its platform type (step 560). Finally, each endpoint system that was selected for updating sends the status of the update to the GUI (step 570). Using method 500 in conjunction with the apparatus disclosed herein, a system administrator can easily update the configuration of multiple computer systems on a network to match the configuration settings for the model system. The GUI provides a consistent interface for administrating different platform types, eliminating the need for a system administrator to learn the specific administration tool for each platform. In addition, the updating is performed automatically, without intervention by a user. Thus, if a system administrator needs to make a single change on 375 different endpoint systems, the system administrator can simply define configuration settings for the model system in step 520 that include the one changed parameter, and can then select all 375 endpoint systems in step 540, and each of these 375 endpoint systems will be updated in step 560. In the prior art, each endpoint system would have to be individually and manually changed using a dedicated administration tool for that type of platform.

Note that not all of the steps in method 500 of FIG. 5 are required to practice the present invention. For example, the reporting of status information in step 570 is optional. In addition, the steps of method 500 may be suitably split or combined into different steps within the scope of the preferred embodiments. The invention is defined by the claims herein, not be the specific method steps shown in FIG. 5. Method 500 is shown as one suitable implementation within the scope of the preferred embodiments.

Figure 6:
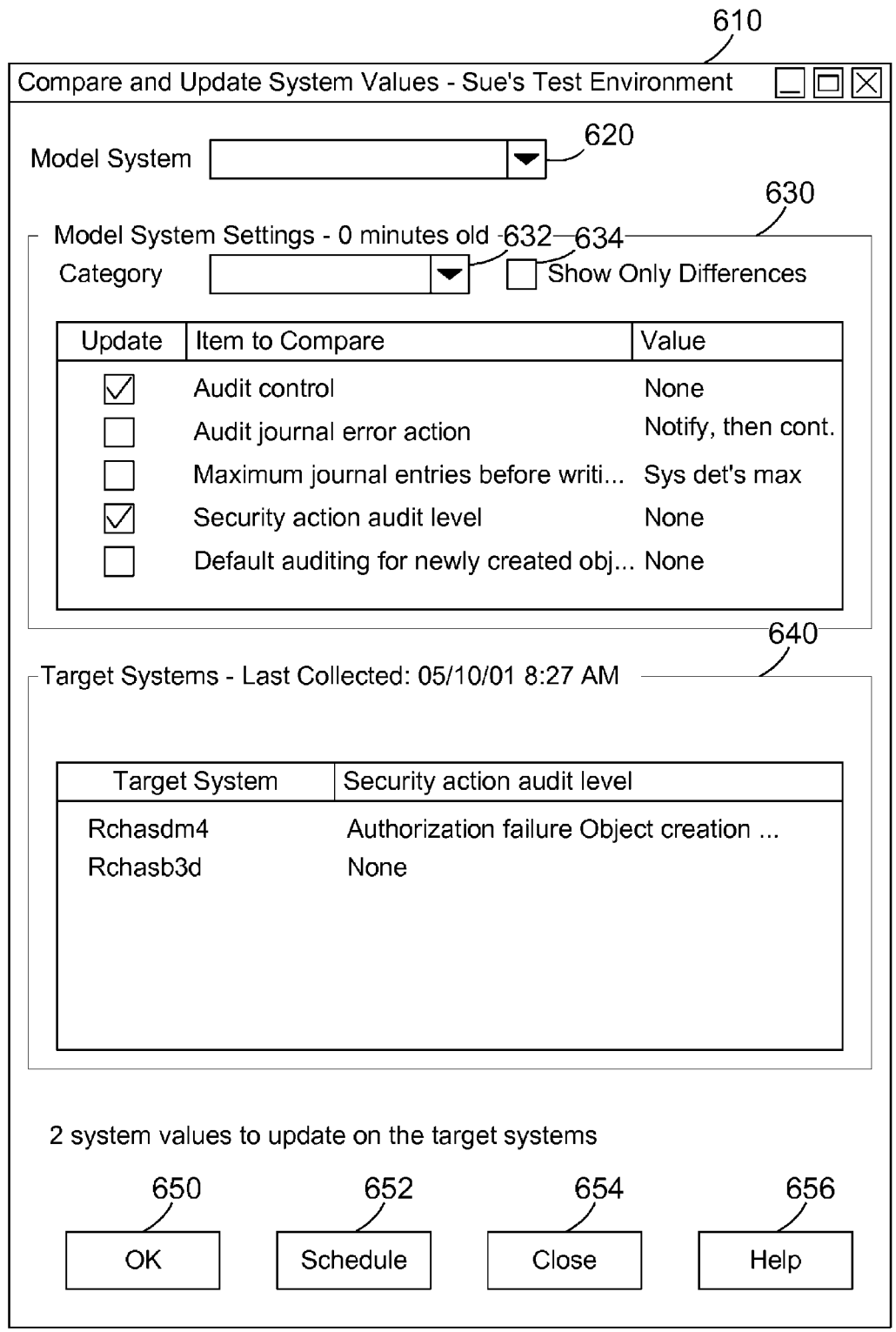
FIG. 6 is a diagram of a graphical user interface screen that is presented by the system configuration manager 222 of FIGS. 2 and 4 to manage the configuration of computer systems on a network in accordance with the preferred embodiments.

One example of a suitable display panel 610 is shown in FIG. 6, and could be a display panel presented to a user by administration GUI 212 in FIG. 2. Panel 610 includes a drop-down list 620 for selecting a model system. In the preferred embodiments, drop-down list 620 includes each endpoint system and also includes a "customize" button that invokes an editor and allows a user to define a profile of configuration settings (referred to herein as a "settings profile"). A box 630 displays various defined configuration settings. A drop-down box 632 allows selecting a defined category of configuration settings. Box 634 allows the user to select that only the differences between the model system and the selected endpoint systems are displayed. In the example in FIG. 6, the defined categories of configuration settings are: audit control, audit journal error action, maximum journal entries before writing, security action audit level, and default auditing for newly created objects. Each of these defined categories include check boxes for selecting which parameters are compared and updated. Thus, we see that the term "configuration settings" includes any portion or all of the configuration settings for a particular computer system. Another box 640 displays the endpoint systems that are selected, and their differences when compared to the model configuration settings. For the specific example in FIG. 6, the target system System1 has one difference relating to object creation, while the target system System2 has no difference when compared to the model configuration settings.

We assume that the user selects System1 as the only endpoint system to update, and the user then clicks OK button 650. In response, the platform type of System1 is determined and compared with the platform type of the model system. If the model system and selected endpoint systems have different platform types, the configuration mapping mechanism will map the model configuration settings to corresponding configuration settings for each platform type. If the model system and selected endpoint systems are of the same platform type, the configuration mapping mechanism is not needed, and the configuration settings of each selected endpoint system are updated to reflect the values of configuration settings in the model system. If the user clicks the schedule button 652 instead of the OK button 650, the user can then schedule when the update will occur. Clicking on the close button 654 results in closing panel 610 without saving changes. Help button 656 is used to invoke help in dealing with display panel 610.

FIGS. 7-24 show various different system settings defined in the OS/400 operating system. FIG. 7 lists the auditing category of system settings. FIG. 8 lists the system settings for date and time. FIG. 9 lists the devices category of system settings. FIG. 10 lists the library lists category of system settings. FIG. 11 lists the international category of system settings. FIG. 12 lists the jobs category of system settings. FIG. 13 lists the messages and logging category of system settings. FIG. 14 lists the password category of system settings. FIG. 15 lists the performance category of system settings. FIG. 16 lists the power category of system settings. FIG. 17 lists the printing category of system settings. FIG. 18 lists the restart category of system settings. FIG. 19 lists the security category of system settings. FIG. 20 lists the sign-on category of system settings. FIG. 21 lists the storage category of system settings. FIG. 22 lists the system controls category of system settings. FIG. 23 lists the management central per endpoint system category of system settings. And FIG. 24 lists the management central per central system category of system settings. These specific system settings in FIGS. 7-24 are shown as one suitable example of system settings for the OS/400 platform that may be set by the system configuration manager 222 in accordance with the preferred embodiments. These system settings will be familiar to one skilled in the art who has experience with systems settings for the OS/400 platform.

Figures 24, 25:
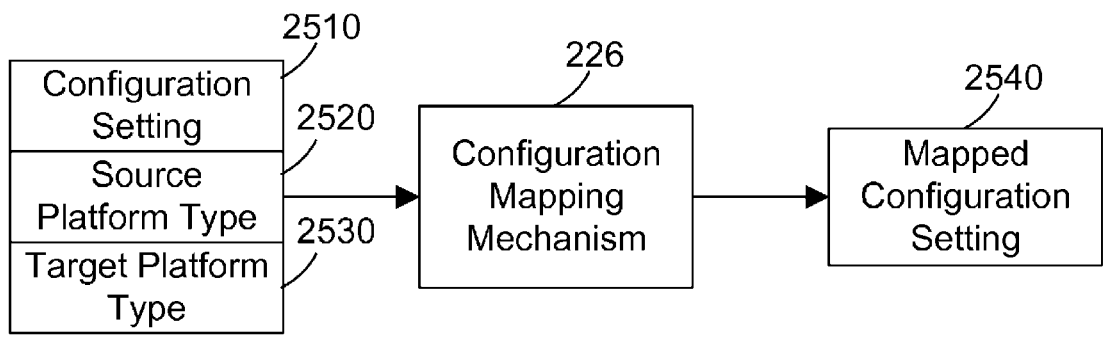

FIG. 25 illustrates the function of the configuration mapping mechanism 226 of the preferred embodiments. The configuration mapping mechanism 226 must know the platform type of the configuration settings being read and must know the platform type of the output. In one suitable implementation, configuration mapping mechanism 226 is invoked by system configuration manager 222 passing the configuration setting to be mapped 2510, the source platform type 2520, and the target platform type 2530. The configuration mapping mechanism 226 then determines the configuration setting for the target platform 2530 that corresponds to the configuration setting to be mapped 2510 from the source platform type 2520, and outputs that mapped configuration setting 2540. Note that the term "platform type" includes not only types of physical computer platforms on the network, but may also include a model "settings profile" that defines hardware-independent configuration settings that can then be mapped to any suitable platform.

One suitable example to illustrate the function of configuration mapping mechanism 226 is mapping between configuration settings in an IBM iSeries platform (running the OS/400 operating system) and corresponding configuration settings in a Microsoft Windows2000 platform. The "decimal format" configuration setting in the IBM iSeries platform could be mapped to the "decimal symbol" configuration setting in the Windows2000 platform. The "locale" configuration setting in the IBM iSeries platform could be mapped to the "input locale" configuration setting in the Windows2000 platform. Similarly, the "language/country" configuration setting in the IBM iSeries platform could be mapped to the "your locale" configuration setting in the Windows2000 platform. These few examples are shown to illustrate the general concept of mapping between configuration settings on one platform to corresponding configuration settings on a different platform, and the configuration mapping mechanism 226 expressly extends to any suitable mapping between configuration settings on different platforms.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

The invention claimed is:

1. A computer-readable program product comprising:
    (A) a system configuration manager that includes:
        (A1) model configuration settings that specify desired configuration settings for a computer system; and
        (A2) a configuration mapping mechanism that maps at least one configuration setting for at least one computer system to the model configuration settings, wherein the configuration mapping mechanism maps the at least one configuration setting for a selected platform to corresponding configuration settings for a different platform; and
    (B) computer-readable signal bearing recordable media bearing the system configuration manager.

2. The program product of claim 1 wherein the at least one configuration setting comprises system settings and customization settings.

3. The program product of claim 1 wherein the system configuration manager further comprises a computer program that runs on each at least one computer system and that reports status of any requested update of configuration settings.

* * * * *